US012126543B2

(12) United States Patent
Eaton (10) Patent No.: US 12,126,543 B2
(45) Date of Patent: *Oct. 22, 2024

(54) METHODS AND SYSTEMS FOR PROVIDING MULTIPLE NETWORKS FROM A GATEWAY (71) Applicant: DISH Network L.L.C., Englewood, CO (US)

(72) Inventor: Zane C. Eaton, Pompano Beach, FL (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,828

(22) Filed: Oct. 30, 2023

(65) Prior Publication Data

US 2024/0064114 A1   Feb. 22, 2024

Related U.S. Application Data (63) Continuation of application No. 17/715,833, filed on Apr. 7, 2022, now Pat. No. 11,818,054.

(60) Provisional application No. 63/321,588, filed on Mar. 18, 2022.

(51) Int. Cl.
*G06F 15/16* (2006.01)
*H04L 47/785* (2022.01)
*H04L 47/70* (2022.01)
*H04L 47/80* (2022.01)

(52) U.S. Cl.
CPC ......... *H04L 47/785* (2013.01); *H04L 47/805* (2013.01); *H04L 47/821* (2013.01)

(58) Field of Classification Search
CPC .... H04L 47/785; H04L 47/805; H04L 47/821
See application file for complete search history.

(56) References Cited

U.S. PATENT DOCUMENTS

| | | |
|---|---|---|
| 2009/0180430 A1 | 7/2009 | Fadell |
| 2009/0245224 A1* | 10/2009 | Iyer ............... H04W 56/003 370/345 |
| 2010/0182959 A1 | 7/2010 | Cook et al. |
| 2013/0053014 A1 | 2/2013 | Sung |
| 2013/0210379 A1 | 8/2013 | Cloutier |
| 2013/0272227 A1 | 10/2013 | Gallagher et al. |
| 2013/0326515 A1 | 12/2013 | Hara et al. |

(Continued)

*Primary Examiner* — Hieu T Hoang
(74) *Attorney, Agent, or Firm* — Perkins Coie LLP (57) ABSTRACT The present disclosure is directed to methods and systems for providing multiple networks from a gateway. A multiple network gateway system can include a gateway (e.g., a router) with the ability to support multiple, configurable, and customizable networks. The gateway can connect to a source (e.g., internet service provider (ISP), cable networks, OTA networks, satellite networks, etc.) and determine the bandwidth. Using the determined bandwidth, the gateway can allocate the bandwidth among the multiple networks according to a priority order of the networks. In some implementations, the gateway can receive customizable features from the user. Examples of the customizable features can include security options, parental controls, operational hours, MAC address specific operations, number of user limits, and internet usage tracking. The gateway can determine the priority of each network based on the customizable features.

20 Claims, 6 Drawing Sheets (56) References Cited

U.S. PATENT DOCUMENTS

| | | |
|---|---|---|
| 2015/0215941 A1 | 7/2015 | Cook et al. |
| 2016/0006500 A1 | 1/2016 | Radpour |
| 2016/0095132 A1 | 3/2016 | Hodroj et al. |
| 2017/0006504 A1 | 1/2017 | Townsend et al. |
| 2017/0048924 A1 | 2/2017 | Mate et al. |
| 2017/0155590 A1 | 6/2017 | Dillion et al. |
| 2017/0347269 A1 | 11/2017 | Wu et al. |
| 2018/0123950 A1 | 5/2018 | Garg et al. |
| 2018/0351809 A1 | 12/2018 | Meredith et al. |
| 2020/0287788 A1 | 9/2020 | Triplet et al. |
| 2020/0336398 A1* | 10/2020 | Thomas ............. H04L 43/0876 |
| 2020/0344772 A1 | 10/2020 | Munirathin et al. |
| 2021/0051677 A1 | 2/2021 | Sun et al. |
| 2022/0030665 A1 | 1/2022 | Nakanish et al. |
| 2022/0078691 A1 | 3/2022 | Panje et al. |
| 2022/0150122 A1 | 5/2022 | Suwi et al. |
| 2023/0300084 A1 | 9/2023 | Eaton |

* cited by examiner

METHODS AND SYSTEMS FOR PROVIDING MULTIPLE NETWORKS FROM A GATEWAY

CROSS-REFERENCE TO RELATED PATENT APPLICATIONS

This application is a continuation of U.S. patent application Ser. No. 17/715,833, filed Apr. 7, 2022, entitled "METHODS AND SYSTEMS FOR PROVIDING MULTIPLE NETWORKS FROM A GATEWAY," which claims priority to U.S. Patent Application No. 63/321,588, filed Mar. 18, 2022, entitled "METHODS AND SYSTEMS FOR PROVIDING MULTIPLE NETWORKS FROM A GATEWAY," the entire disclosure of which is herein incorporated by reference.

BACKGROUND

In some cases, users only have a single internet connection coming into their homes. To access the internet, users connect to the single internet network. Internet service providers (ISPs) typically do not allow more than one or possibly two routers on an individual internet connection without charging a substantially increased amount of money.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for providing multiple networks from a gateway. The multiple network gateway system can include a gateway (e.g., a router, such as a 5G router) with the ability to support multiple, configurable, and customizable networks (e.g., with multiple service set identifiers (SSIDs)). The gateway can connect to a source (e.g., internet service provider (ISP), cable networks, OTA networks, satellite networks, etc.) and determine the bandwidth from the source. Using the determined bandwidth, the gateway can allocate the bandwidth among the multiple networks according to a priority order of the networks. For example, a first network (SSID1) has higher bandwidth priority than a second network (SSID2).

In some implementations, the gateway can receive customizable features from the user. Examples of the customizable features can include security options, parental controls, operational hours, MAC address specific operations, number of user limits, or internet usage tracking. For example, a parent can define when a network for their child is available in the house by setting the network to only operate during specific hours of the day, setting a limit on the amount of data that can be downloaded, restricting the type of content than can be accessed, and setting a limit on the download capability of the child. The gateway can determine the priority of the network based on the customizable features.

Methods and systems disclosed herein can provide technical advantages over conventional gateway systems. For example, the disclosed multiple network gateway system provides: 1) the ability to support multiple, configurable, and customizable networks; 2) the ability to allocate bandwidth among the multiple networks; 3) the ability to perform load balancing by the gateway; and 4) the ability to dynamically adjust the bandwidth based on a priority order of the networks and/or customizable features.

Figure 1:
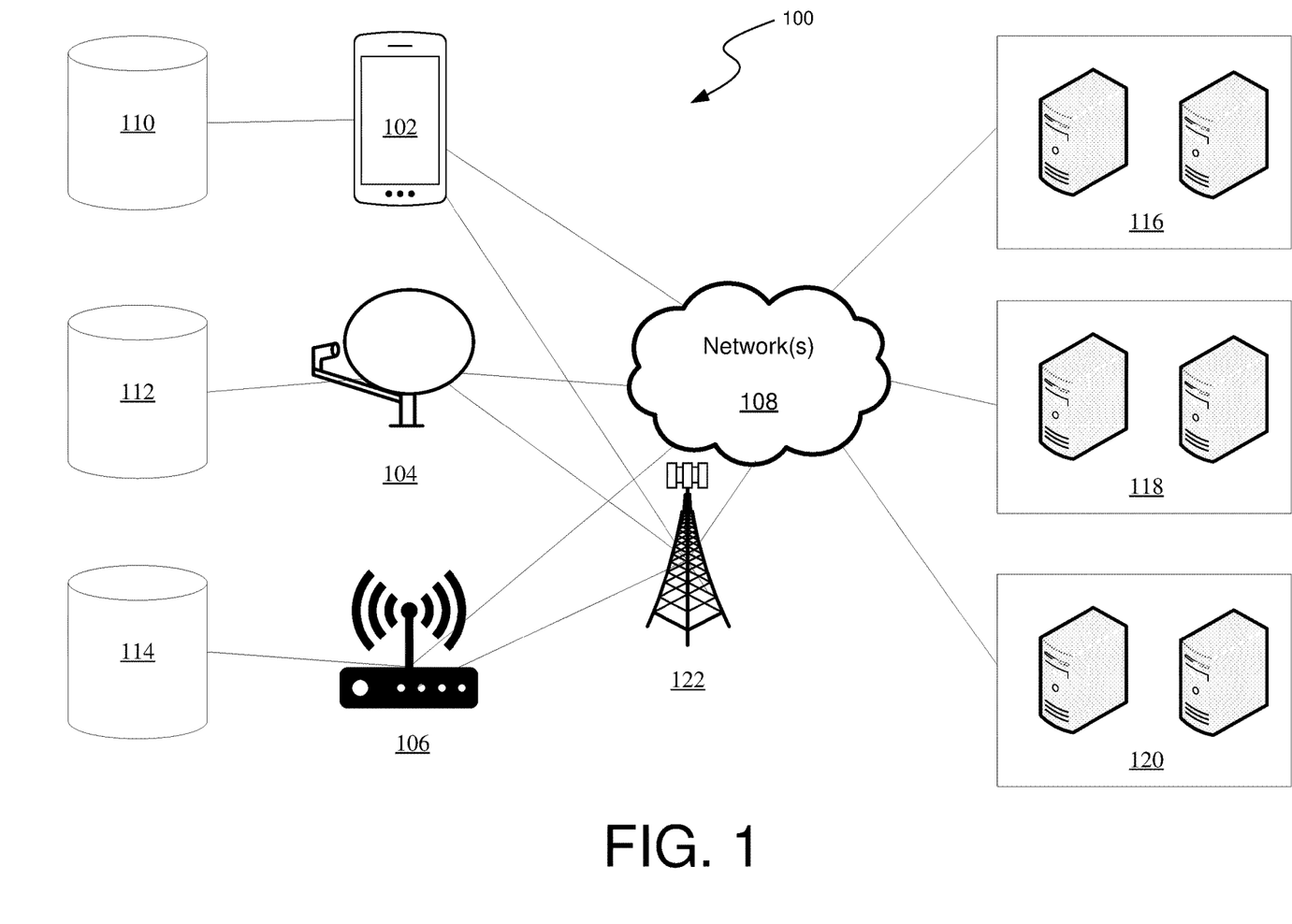
FIG. 1 illustrates an example of a distributed system for providing multiple networks from a gateway.

FIG. 1 illustrates an example of a distributed system for providing multiple networks from a gateway. Example system 100 presented is a combination of interdependent components that interact to form an integrated whole for providing multiple networks from a gateway. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to support multiple, configurable, and customizable networks from a gateway. In one example, a client device 102 may be a mobile phone, a client device 104 may be a smart OTA antenna, and a client device 106 may be a broadcast module box (e.g., set-top box). In other example aspects, client device 106 may be a gateway device (e.g., router) that is in communication with sources, such as ISPs, cable networks, or satellite networks. Other possible client devices include but are not limited to tablets, personal computers, televisions, etc. In aspects, a client device, such as client devices 102, 104, and 106, may have access to one or more networks from a gateway. In other aspects, client devices 102, 104, and 106, may be equipped to receive data from a gateway. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that determines a prioritized order of the networks, receives customizable features for the networks, and allocates bandwidth among the networks according to the prioritized order of the networks. Client devices 102, 104, and 106 may access content data through the networks. The content data may be stored locally on the client device or run remotely via network(s) 108. For example, a client device may receive a signal from broadcast tower 122 containing content data. The signal may indicate user requested media content. The client device may receive this user requested content data and subsequently store this data locally in databases 110, 112, and/or 114. In alternative scenarios, the user requested content data may be transmitted from a client device (e.g., client device 102, 104, and/or 106) via network (s) 108 to be stored remotely on server(s) 116, 118, and/or 120. A user may subsequently access the media content data from a local database (110, 112, and/or 114) and/or external database (116, 118, and/or 120), depending on where the media content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the requested content data. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in providing content to a user from a gateway with multiple networks. Such databases may contain certain content data such as video titles, actors in movies, video genres, etc. Such data may be transmitted via network(s) 108 to client devices 102, 104, and/or 106 to assist in identifying user requested media content. Because broadcast tower 122 and network(s) 108 are configured to communicate with one another, the systems and methods described herein may be able to identify requested media content in different sources, such as streaming services, local and cloud storage, cable, satellite, or OTA.

Figure 2:
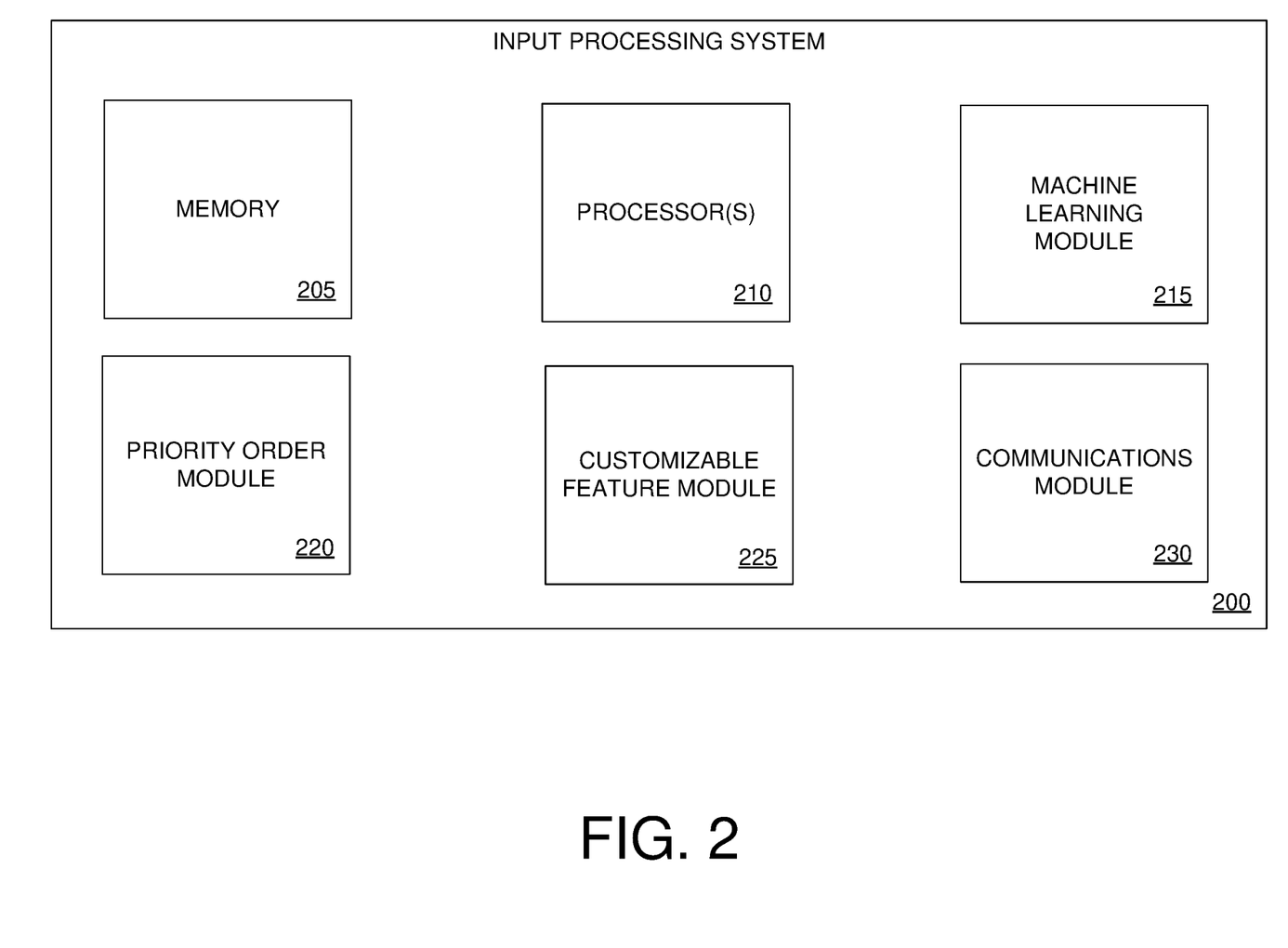
FIG. 2 illustrates an example input processing system for implementing systems and methods for providing multiple networks from a gateway.

FIG. 2 illustrates an example input processing system for implementing systems and methods for providing multiple networks from a gateway. The input processing system (e.g., one or more data processors) is capable of executing algorithms, software routines, and/or instructions based on processing data provided by a variety of sources related to determining a prioritized order of networks and allocating bandwidth to the networks according to the prioritized order. The input processing system can be a general-purpose computer or a dedicated, special-purpose computer. According to the embodiments shown in FIG. 2, the disclosed system can include memory 205, one or more processors 210, machine learning module 215, priority order module 220, customizable feature module 225, and communications module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of machine learning module 215, priority order module 220, customizable feature module 225, and communications module 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the customizable features of the networks, a prioritized order of the networks, or user requested content information, such as audio or video data.

Machine learning module 215 may be configured to analyze gateway settings to determine a prioritized order of the networks for bandwidth allocation. The machine learning module 215 may be configured to determine a prioritized order based on at least one machine-learning algorithm trained on at least one dataset reflecting a user selected prioritized order of networks. The at least one machine-learning algorithms (and models) may be stored locally at databases and/or externally at databases (e.g., cloud databases and/or cloud servers). Client devices may be equipped to access these machine learning algorithms and intelligently identify user preferences, such as the customizable features, and determine a prioritized order of the networks for bandwidth allocation based on at least one machine-learning model that is trained on a user's historical network priority history. For example, if a user frequently prioritizes network A over network B, the user's priority history may be collected to train a machine-learning model to automatically prioritize network A over network B, or over a new network.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process user priority history and other data stores of user preferences (e.g., surveys, user profile settings, etc.) to determine the priority order of the networks of a gateway. Determining a priority order for a certain network may comprise identifying various characteristics of a user's priority history and preferences. For instance, if a user has a user profile that displays preferences of user priority (e.g., parent has higher priority than a child, or a network used for work has a higher priority than a network used for entertainment), then the system described herein may determine that certain networks be prioritized based on the content or user of the network. Based on an aggregation of data from a user's priority history, user profiles, gateway settings, network settings, title of the network, and other user data stores, at least one ML model may be trained and subsequently deployed to automatically determine a priority order of the networks for bandwidth allocation. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet. In some instances, a client device may not be connected to the internet but still configured to receive satellite signals with multimedia information and channel guides. In such examples, the ML model may be locally cached by the client device.

Priority order module 220 is configured identify networks of a gateway and determine a priority order of the networks for bandwidth allocation. The priority order module 220 can determine a priority order for the networks based on user preferences, user settings, the SSID of the network, user credentials associated with the network, purpose of the network (e.g., work, entertainment, school, security, etc.), or the devices connected to the network. In some implementations, the priority order is predetermined by a user, and the priority order module 220 assigns priority values to the networks based on the predetermined priority order. The system described herein can allocate bandwidth to the networks according to the priority order. Should the external bandwidth available not be enough to support all the devices connected to the gateway, the priority order module 220 can disable lower priority networks until the bandwidth is available to meet the minimum bandwidth of higher priority networks.

Customizable feature module 225 is configured to receive and analyze customizable features for each network of the gateway. Examples of the customizable features can include security options, parental controls, operational hours, MAC address specific operations, number of user limits, and internet usage tracking. The customizable feature module 225 can rank the networks based on the customizable feature settings. For example, a network with fewer settings receives a lower ranking than a network with more settings. Priority order module 220 can use the customizable feature settings from customizable feature module 225 to determine a priority order of the networks.

Communications module 230 is associated with sending/receiving information (e.g., priority order information from machine learning module 215, priority order module 220, and customizable feature module 225) with a remote server or with one or more client devices, streaming devices, routers, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 230 sends priority order information identified by the priority order module 220 and information identified by the customizable feature module 225. Furthermore, communications module 230 may be configured to communicate content data to a client device and/or OTA box, router, smart OTA antenna, and/or smart TV, etc.

Figure 3:
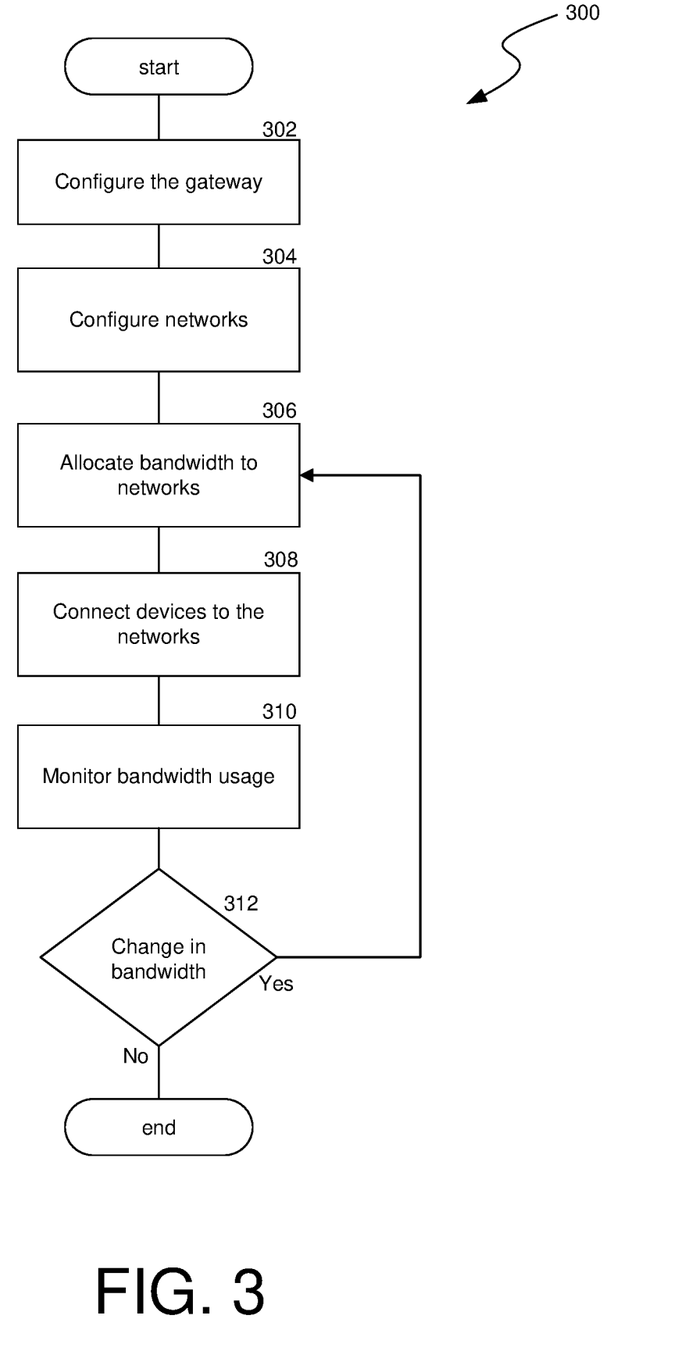
FIG. 3 is a flow diagram illustrating a process used in some implementations for providing multiple networks from a gateway.

FIG. 3 is a flow diagram illustrating a process 300 used in some implementations for providing multiple networks from a gateway. In some implementations, process 300 is triggered by a user activating a subscription for multi-network connectivity, powering on a device, a device connecting to a gateway (e.g., router), powering on the gateway, the gateway connecting to a source (e.g., ISP, cable network, satellite network, etc.), or the user downloading an application on a device for multi-network connectivity. In various implementations, process 300 is performed locally on the user device or performed by cloud-based device(s) that can provide/support multiple networks from a gateway.

At block 302, process 300 connects a gateway to a source and configures the settings of the gateway. Process 300 can determine the number of networks to provide from the gateway. The gateway can provide a default number of networks or a user-indicated number of networks. A user can select gateway settings on the gateway device, such as on a user interface screen or buttons on the gateway device, or the user can input settings in an application on a user device, such as a smart phone or tablet. When registering or activating the gateway, the user can provide access information (e.g., passwords, usernames, biometrics, etc.), user preferences, security settings, parental controls, operational hours, MAC address specific operations, user limits, number of user limits, and network usage settings for the networks. For example, a user can define the time of day a network can be accessed, define the user credentials required to access a network, define the devices that can connect to the network, the duration of network access, set a limit on the amount of data that can be streamed or downloaded on a network, and define the type of content than can be viewed on a network. The user can provide SSIDs (e.g., customizable names) for the multiple networks, assign a purpose (e.g., work, school, entertainment, etc.) to each network, or assign a user or device to each network.

At block 304, process 300 configures the networks provided by the gateway based on the gateway settings. Process 300 can generate a priority order of the networks for allocating bandwidth based on the gateway settings. In some embodiments, the priority order of the networks is based on the SSIDs of the networks. For example, a user can assign a priority rank to the networks based on the SSID, such as SSID1 has a higher priority than SSID2. In some embodiments, the priority order of the networks is based on the users accessing the networks. For example, a first network being accessed by a first user (e.g., parent, landlord, etc.) has a higher priority than a second network being accessed by a second user (e.g., a child, tenant, etc.). Process 300 can identify the users based on user credentials (e.g., usernames, passwords, pins, biometrics, etc.) or user devices. In some embodiments, the priority order of the networks is based on the frequency that the networks are accessed by users. For example, if a first network is access more frequently than a second network, the first network has a higher priority than the second network.

In some embodiments, the priority order of the networks is based on the purpose assigned to each network. For example, a network with an assigned purpose of work or school has a higher priority than a network with an assigned purpose of entertainment. In some embodiments, the priority order of the networks is based on the time of day. For example, a first network has a higher priority than a second network in the evening from 6 PM until 9 PM, such as the network of a student has a higher priority each evening for homework than the network of a gamer. In some embodiments, the priority order of the networks is based on the devices accessing the networks. For example, a first network being accessed by a first device (e.g., laptop or tablet) has a higher priority than a second network being accessed by a second device (e.g., smartphone, smart TV, etc.). In some embodiments, the priority order of the networks is based on requests from the user(s). For example, a user can request to have their network receive top priority for bandwidth allocation. At block 306, process 300 allocates the bandwidth to the networks according to the priority order. Process 300 can have a priority queue of the networks. When data is received or transmitted from the gateway, the bandwidth is allocated by the gateway for the transmitting or receiving action according to the priority order of the networks. Should the external bandwidth available not be enough to support all the devices, lower priority networks can be disabled until the bandwidth is available to meet the minimum bandwidth requirements of higher priority networks.

At block 308, process 300 connects the user devices to the networks provided by the gateway. The user devices can access the networks according to the gateway settings of block 302, such as security settings, parental controls, operational hours, MAC address specific operations, number of user limits, and network usage settings. At block 310, process 300 monitors the bandwidth of the system. At block 312, process 300 determines whether there is a change in the bandwidth. If there is a detected change in bandwidth, process 300 re-allocates (returns to block 306) the new bandwidth according to the priority order.

In some embodiments, process 300 ensures that networks of higher priority in the priority queue, receive priority over other networks and can deactivate/disconnect lower priority networks when the bandwidth falls below a threshold. For example, an ISP is supposed to be providing internet at 100 megabits/sec but process 300 detects the ISP is providing internet at 20 megabits/sec. Process 300 can adjust the allocation of the bandwidth among the networks, so the higher priority networks receive internet over the lower priority networks.

In some implementations, process 300 monitors the networks and determines when to enforce the gateway settings. In a first example, when a user reaches their download capacity for the network, process 300 sends an alert to the user device or disconnects the user device from the network. In a second example, when a user reaches the end of their operational hours on the network, process 300 sends an alert to the user device or disconnects the user device from the network. In a third example, when the number of connected devices reaches a threshold, process 300 sends an alert to the user devices or prevents additional devices from connecting to the network.

Process 300 can create a network that is activated for an operation time threshold and is deactivated once the operation time threshold is reached. For example, process 300 creates a network that is available for two weeks and is automatically deleted when the two weeks are over. The gateway can create a network(s) based on various conditions, such as detection of a predefined device type on the network. For example, if process 300 detects an ISP camera device connect to the gateway, process 300 can create an ISP camera dedicated network.

Figure 4:
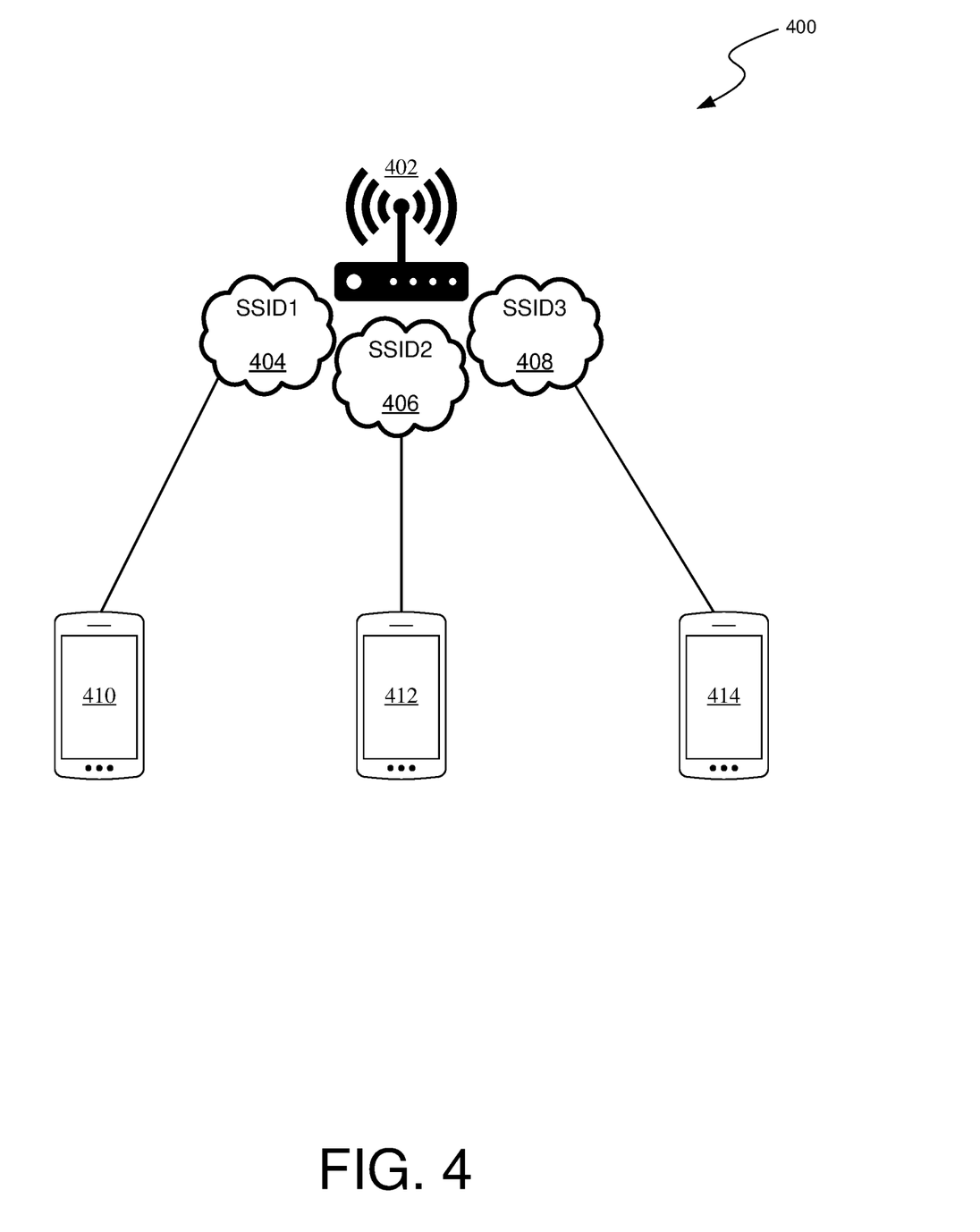
FIG. 4 illustrates an example of a gateway with multiple networks, as described herein.

FIG. 4 illustrates an example of a gateway with multiple networks, as described herein. In environment 400, gateway 402 (e.g., router) provides multiple networks (404, 406, and 408) to multiple devices (410, 412, and 414). Device 410 connects to network 404 with an SSID1, device 412 connects to network 406 with an SSID2, and device 414 connects to network 408 with an SSID3.

Figure 5:
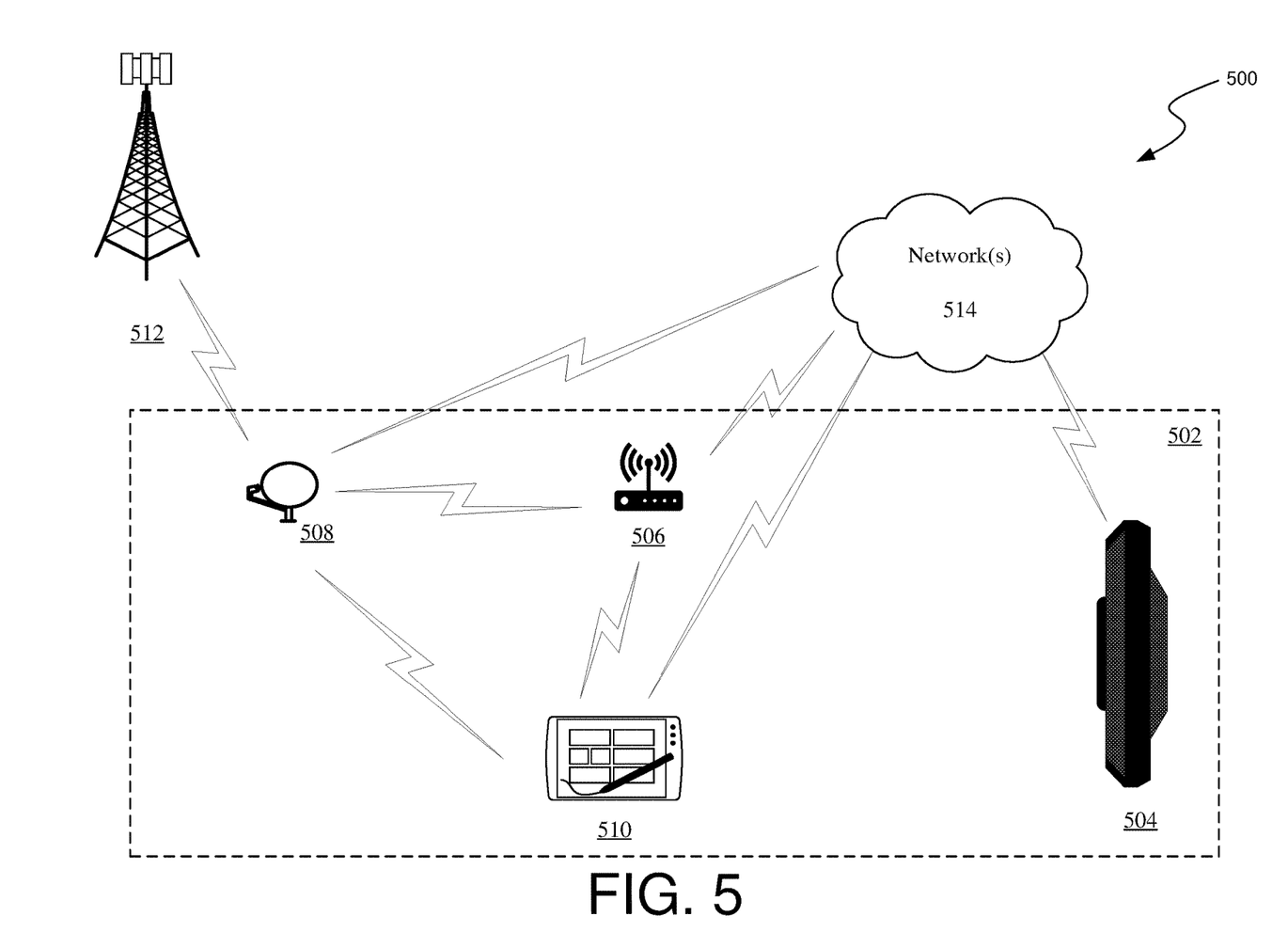
FIG. 5 illustrates an example environment of operation of the disclosed technology.

FIG. 5 illustrates an example environment of operation of the disclosed technology. In the example environment illustrated in FIG. 5, area 502 may represent a house, a commercial building, an apartment, a condo, or any other type of suitable dwelling. Inside area 502 is at least one television 504, an OTA box 506 (e.g., router or broadcast module box) an OTA antenna 508, and a mobile device 510. Each of these devices may be configured to communicate with network(s) 514. OTA box 506 may be configured as a central gateway communicable with various multimedia content providers, networks, devices, and user storage sources, among other servers and databases housing content available for retrieval and display on user devices. Network(s) 514 may be a WiFi network and/or a cellular network. The OTA antenna 508 may also be configured to receive local broadcast signals from local broadcast tower 512 or satellite broadcast tower.

Figure 6:
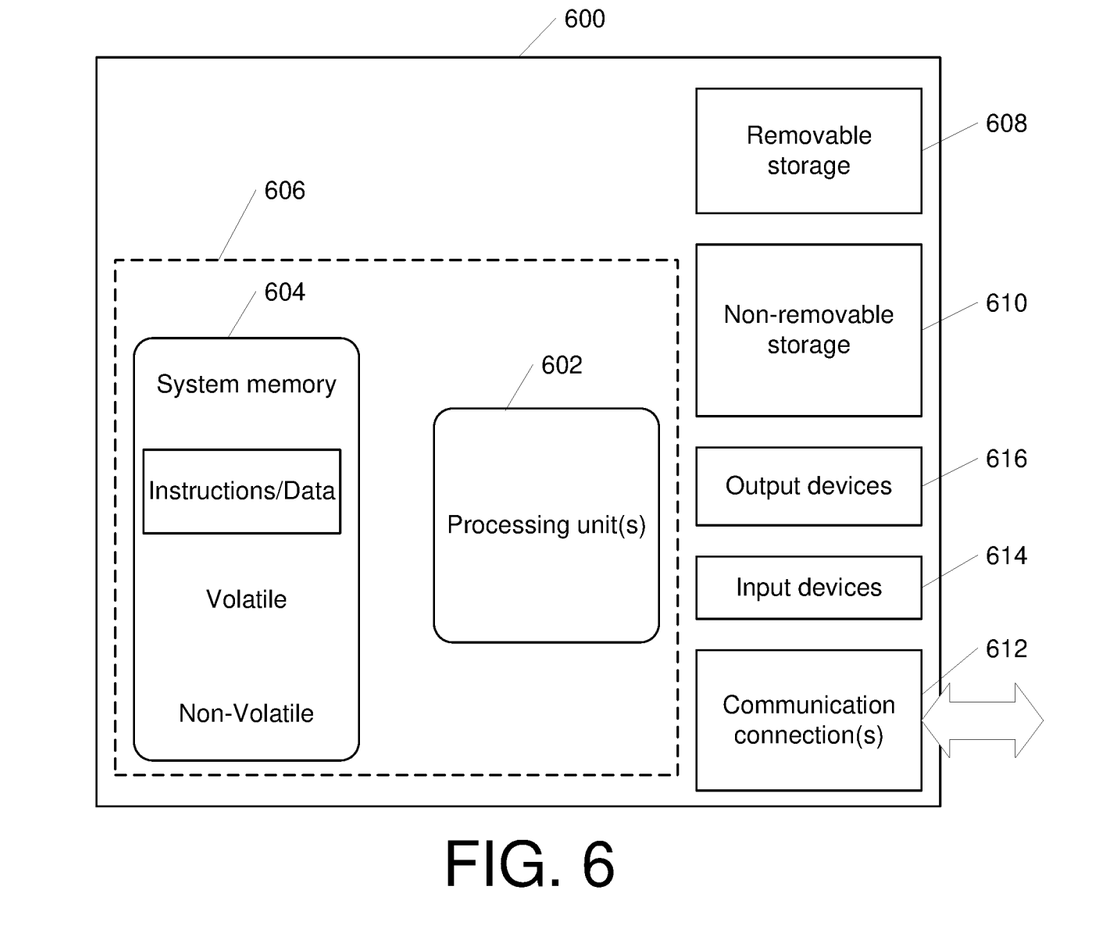
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable 608 and/or non-removable 610) including, but not limited to, magnetic or optical disks or tape. Similarly, environment 600 may also have input device(s) 614 such as keyboard, mouse, pen, voice input, etc., and/or output device(s) 616 such as a display, speakers, printer, etc. Also included in the environment may be one or more communication connections, 612, such as Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method comprising:
receiving a number of customizable settings for each of two or more networks provided by a gateway;
determining to prioritize allocating a bandwidth to at least one network of the two or more networks over other networks of the two or more networks based on the number of customizable settings for each of the two or more networks, wherein the at least one network has a higher number of customizable settings than the other networks, wherein the bandwidth is provided from the gateway;
allocating the bandwidth to the two or more networks based on the determining; and
connecting the two or more networks to two or more respective devices.

2. The method of claim 1, wherein the at least one network is a first network, the method further comprising:
configuring the two or more networks provided by the gateway, wherein the two or more networks include the first network and a second network; and
in response to determining the bandwidth is below a threshold, disconnecting the second network from the gateway based on the first network being prioritized over the second network.

3. The method of claim 1, wherein the at least one network is a first network, the method further comprising:
receiving a first assigned purpose for the first network and a second assigned purpose for a second network of the two or more networks; and
determining a priority order of allocating the bandwidth to the first network and the second network based on the first assigned purpose and the second assigned purpose.

4. The method of claim 1, wherein the two or more networks include a first network, a second network, and a third network, the method further comprising:
detecting a device connect to the third network provided by the gateway;
generating a priority order of allocating the bandwidth among the first network, the second network, and the third network based on the number of customizable settings associated with each network; and
allocating the bandwidth to the first network, the second network, and the third network based on the priority order.

5. The method of claim 1, further comprising:
detecting a change in the bandwidth provided from the gateway; and
re-allocating, based on the change, the bandwidth among the two or more networks.

6. The method of claim 1, wherein prioritizing allocating the bandwidth is determined by at least one machine-learning algorithm, wherein the at least one machine-learning algorithm is trained based on at least one dataset associated with a past prioritization of allocating bandwidth.

7. The method of claim 1, wherein the customizable settings include two or more of a security setting, a content control setting, an operational time setting, a media access control address, a user limit setting, or a network usage tracking setting.

8. A system comprising:
one or more processors; and
one or more memories storing instructions that, when executed by the one or more processors, cause the system to perform a process comprising:
receiving a number of customizable settings for each of two or more networks provided by a gateway;
determining to prioritize allocating a bandwidth to at least one network of the two or more networks over other networks of the two or more networks based on the number of customizable settings for each of the two or more networks, wherein the at least one network has a higher number of customizable settings than the other networks, wherein the bandwidth is provided from the gateway;
allocating the bandwidth to the two or more networks based on the determining; and
connecting the two or more networks to two or more respective devices.

9. The system according to claim 8, wherein the at least one network is a first network, wherein the process further comprises:

configuring the two or more networks provided by the gateway, wherein the two or more networks include the first network and a second network; and in response to determining the bandwidth is below a threshold, disconnecting the second network from the gateway based on the first network being prioritized over the second network.

10. The system according to claim 8, wherein the at least one network is a first network, wherein the process further comprises:

receiving a first assigned purpose for the first network and a second assigned purpose for a second network of the two or more networks; and determining a priority order of allocating the bandwidth to the first network and the second network based on the first assigned purpose and the second assigned purpose.

11. The system according to claim 8, wherein the two or more networks include a first network, a second network, and a third network, wherein the process further comprises:

detecting a device connect to the third network provided by the gateway;

generating a priority order of allocating the bandwidth among the first network, the second network, and the third network based on the number of customizable settings associated with each network; and allocating the bandwidth to the first network, the second network, and the third network based on the priority order.

12. The system according to claim 8, wherein the process further comprises:

detecting a change in the bandwidth provided from the gateway; and re-allocating, based on the change, the bandwidth among the two or more networks.

13. The system according to claim 8, wherein prioritizing allocating the bandwidth is determined by at least one machine-learning algorithm, wherein the at least one machine-learning algorithm is trained based on at least one dataset associated with a past prioritization of allocating bandwidth.

14. The system according to claim 8, wherein the customizable settings include two or more of a security setting, a content control setting, an operational time setting, a media access control address, a user limit setting, or a network usage tracking setting.

15. A non-transitory computer-readable medium storing instructions that, when executed by a computing system, cause the computing system to perform operations comprising:

receiving a number of customizable settings for each of two or more networks provided by a gateway;

determining to prioritize allocating a bandwidth to at least one network of the two or more networks over other networks of the two or more networks based on the number of the customizable settings for each of the two or more networks, wherein the at least one network has a higher number of customizable settings than the other networks, wherein the bandwidth is provided from the gateway;

allocating the bandwidth to the two or more networks based on the determining; and connecting the two or more networks to two or more respective devices.

16. The non-transitory computer-readable medium of claim 15, wherein the at least one network is a first network, wherein the operations further comprise:

configuring the two or more networks provided by the gateway, wherein the two or more networks include the first network and a second network; and in response to determining the bandwidth is below a threshold, disconnecting the second network from the gateway based on the first network being prioritized over the second network.

17. The non-transitory computer-readable medium of claim 15, wherein the at least one network is a first network, wherein the operations further comprise:

receiving a first assigned purpose for the first network and a second assigned purpose for a second network of the two or more networks; and determining a priority order of allocating the bandwidth to the first network and the second network based on the first assigned purpose and the second assigned purpose.

18. The non-transitory computer-readable medium of claim 15, wherein the two or more networks include a first network, and a second network, and a third network, wherein the operations further comprise:

detecting a device connect to the third network provided by the gateway;

generating a priority order of allocating the bandwidth among the first network, the second network, and the third network based on the number of customizable settings associated with each network; and allocating the bandwidth to the first network, the second network, and the third network based on the priority order.

19. The non-transitory computer-readable medium of claim 15, wherein the operations further comprise:

detecting a change in the bandwidth provided from the gateway; and re-allocating, based on the change, the bandwidth among the two or more networks.

20. The non-transitory computer-readable medium of claim 15, wherein prioritizing allocating the bandwidth is determined by at least one machine-learning algorithm, wherein the at least one machine-learning algorithm is trained based on at least one dataset associated with a past prioritization of allocating bandwidth, and wherein the customizable settings include two or more of a security setting, a content control setting, an operational time setting, a media access control address, a user limit setting, or a network usage tracking setting.

* * * * *